United States Patent
Donth et al.

(10) Patent No.: US 7,955,134 B2
(45) Date of Patent: Jun. 7, 2011

(54) PHOTOVOLTAIC INVERTER

(75) Inventors: Andreas Donth, Edermuende (DE);
Gundolf Mueller, Fuldabrueck (DE);
Klaus Kube, Friedland (DE)

(73) Assignee: SMA Solar Technology AG, Niestetal (DE)

( * ) Notice: Subject to any disclaimer, the term of this patent is extended or adjusted under 35 U.S.C. 154(b) by 92 days.

(21) Appl. No.: 12/418,124

(22) Filed: Apr. 3, 2009

(65) Prior Publication Data

US 2009/0291594 A1 Nov. 26, 2009

(30) Foreign Application Priority Data

May 20, 2008 (EP) .................................... 08009294

(51) Int. Cl.
*H01R 13/68* (2006.01)
(52) U.S. Cl. ...................................................... 439/621
(58) Field of Classification Search .................. 439/621, 439/622, 535, 372, 276; 136/244, 251, 25, 136/245, 291
See application file for complete search history.

(56) References Cited

U.S. PATENT DOCUMENTS

| 6,780,061 B1* | 8/2004 | Gibboney ................ 439/620.27 |
| 6,869,313 B2* | 3/2005 | Gibboney ................ 439/620.15 |
| 2003/0052543 A1 | 3/2003 | Boost |

FOREIGN PATENT DOCUMENTS

| DE | 20 2006 003 596 U1 | 7/2006 |
| EP | 1 667 315 A2 | 6/2006 |

* cited by examiner

*Primary Examiner* — Alexander Gilman
(74) *Attorney, Agent, or Firm* — Eschweiler & Associates, LLC

(57) ABSTRACT

A photovoltaic inverter with an inverter housing includes at least a first chamber and a second chamber separated by a wall. The first chamber has a higher Ingress Protection (IP) rating than the second chamber. The first chamber accommodates at least one electronic component part of the photovoltaic inverter. A surface of the wall facing the second chamber provides a plurality of fuse housings. Each of the fuse housings accommodates a fuse and being coupled to a plug connector electrically connected to the fuse. The plug connectors provide electrical connections to the first chamber.

8 Claims, 4 Drawing Sheets

PHOTOVOLTAIC INVERTER

BACKGROUND OF THE INVENTION

The present invention relates to a photovoltaic inverter with an inverter housing having at least two chambers separated by a wall, the one chamber, which has a high Ingress Protection (IP) rating, comprising the electronic component parts and the other chamber comprising several plug connectors on the wall to the one chamber.

A photovoltaic inverter of the type mentioned herein above is well known. The inverter hereby possesses two chambers, which are disposed separately in the inverter housing, the one chamber, which has a higher IP rating, and which is more specifically rated IP65, accommodates the power electronic component parts such as the circuit board in particular. In the other chamber, which is separated from the one chamber by a wall, in particular the plug connectors to the alternating current (AC) and also to the direct current (DC) side connection with the mains or the photovoltaic (PV) plant are located on the wall.

As already explained, the circuit board is located in the chamber of higher rating; each plug connector is protected on the circuit board by a fuse. If such a fuse blows, not only must the housing of the inverter be opened as a whole, but the chamber of the inverter housing, which accommodates the power electronic parts and which is associated with the higher IP rating and is more specifically rated IP65, must also be made accessible. This is not only time intensive and expensive as a result thereof, it also involves the risk that humidity and dirt may penetrate in this part of the housing, which affects the operability of the inverter in the long run. This is particularly true if the inverters are located outdoors so that, when the higher rated chamber is being opened, there is the risk that this chamber is directly exposed to environmental influences.

BRIEF SUMMARY OF THE INVENTION

It is therefore desirable to provide an inverter of the type mentioned herein above wherein the fuse may be changed easily and at low cost, thereby obviating the need for opening the higher rated housing chamber accommodating the power electronic parts.

In accordance with certain preferred embodiments of the invention, there are provided on the wall several fuse housings, each accommodating one fuse, said fuse housing comprising a plug connector, which is electrically connected to the fuse. If the fuse is damaged, in particular if the fuse blows, it suffices to remove the plug connector in order to change the fuse. This means that the fuse is now a constituent part of the plug connection. In this context, there is particularly provided that the plug connector may be placed or pushed onto the fuse housing. In terms of construction, there is further provided that a fuse receptacle is disposed in the wall, an electric connection to the corresponding electronic part, in particular to the circuit board, starting from said fuse receptacle, which accommodates the fuse housing. The fuse receptacle, including the fuse housing, forms a component part that is firmly connected to the housing wall for separating the two chambers.

According to another variant, there is provided that the fuse housing is a constituent part of the plug connector, said plug connector with the fuse housing being adapted to be removably fastened to a fuse receptacle in the wall, for example, by screwing or clamping the fuse housing on the fuse receptacle. In this variant as well, the fuse has been placed in the region of the plug connector so that, as already explained, the housing chamber of higher rating, which comprises the electronic parts, needs not be opened in order to change the fuse. Advantageously, an appended portion is hereby provided in the region of the fuse receptacle, said appended portion being directly connected to the fuse housing.

In accordance with a particular embodiment, there is provided that the several fuse housings form a housing block, said housing block accommodating the several plug connectors. The advantage thereof is that it is much easier to isolate the housing block against dirt and humidity than this is the case with discrete fuse housings. The housing block itself constitutes in this case the receptacle for the plurality of plug connectors, and consequently the receptacle for the plurality of fuse housings with the discrete fuses. The plurality of fuse housings is formed by corresponding openings in the housing block in which the discrete fuses are seated. The plug connectors are pushed into the openings in the housing block until they contact the respective fuse. On the wall, there are hereby provided fuse receptacles for receiving the fuses. The housing block is connected to the wall, such as by screwing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
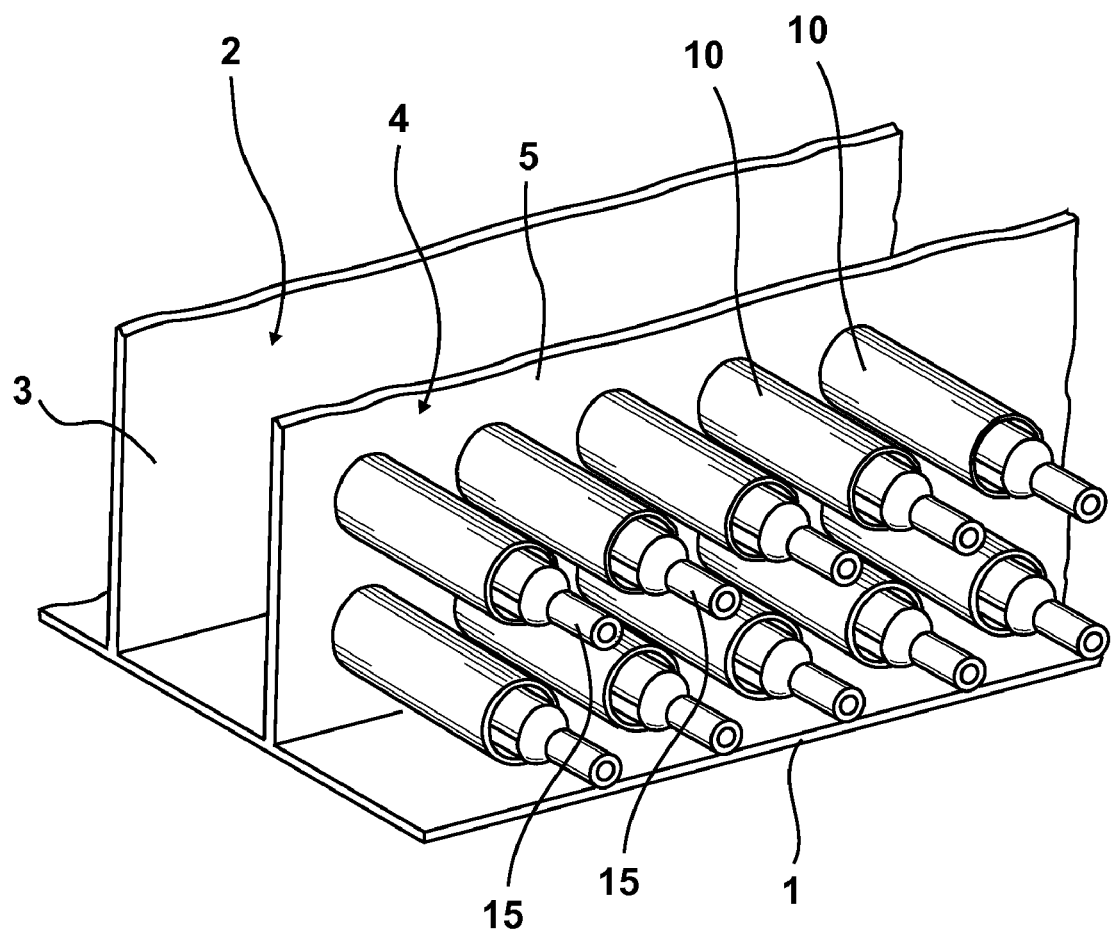
FIG. 1 schematically shows the arrangement of the fuse in the region of the wall between the one first chamber and the second other chamber, several fuse housings being disposed in the wall.

Referring to FIG. 1, the inverter housing is labelled with the numeral 1. The inverter housing 1 possesses the one first chamber 2, which is rated IP65, for accommodating the circuit board 3 and other electronic parts and the second other chamber 4, the two chambers 2 and 4 being separated by the wall 5. On the wall in the region of the other chamber 4 there are located the plug connectors for connection to the AC or DC side. On the other side of the wall 5 there is provided an electric connection such as in the form of a cable 7 for connection to the circuit board 3 for example.

The configuration of a fuse housing 10 on the wall 5 on the side of the other chamber 4 for accommodating the fuse 11 (FIG. 2) will now be described. For this purpose, the chamber 4 has a fuse receptacle 12 on the wall, an appended portion 13 for receiving the fuse housing 10 being provided on the wall in the region of the fuse receptacle 12. The fuse housing 10 may hereby be glued or screwed to the appended portion 13.

As already explained herein above, the fuse housing 10 accommodates the fuse 11, said fuse 11 being retained by the fuse receptacle 12. The plug connector, which is indicated at 15, is pushed, for example plugged, into the fuse housing 10, said plug connector 15 being in electric contact with the fuse 11.

Figure 4:
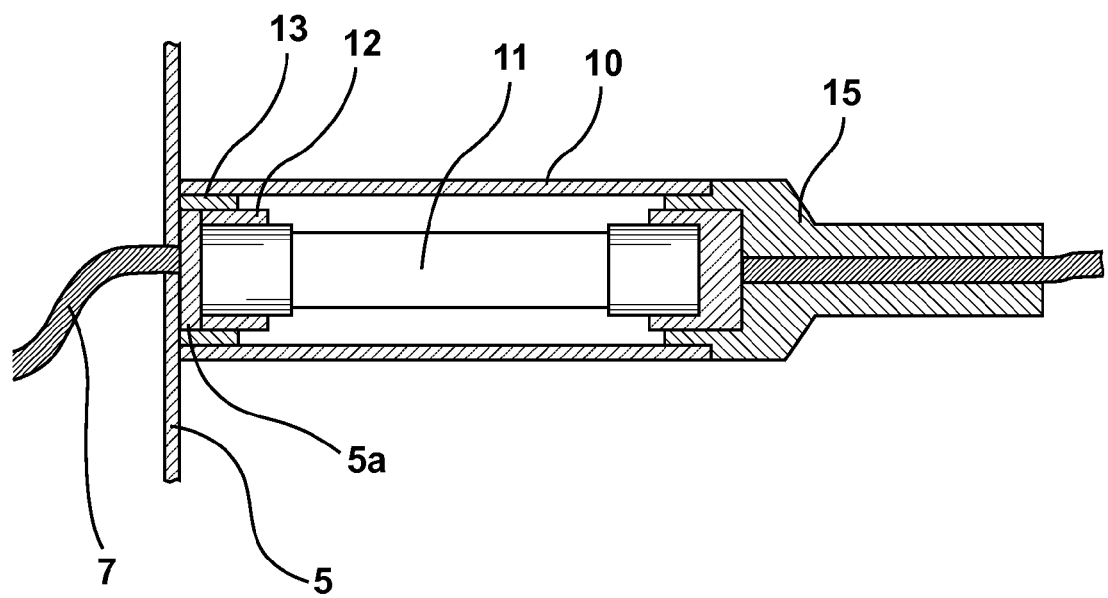
FIG. 4 shows a variant wherein the plug connector and the fuse housing are configured to be made from one piece.

Referring to FIG. 4, the plug connector 15 and the fuse housing 10 are made from one piece. Then, the fuse housing 10 with the plug 15 is removably fastened as one piece to the appended portion 13 or to the fuse receptacle 12.

Figure 2:
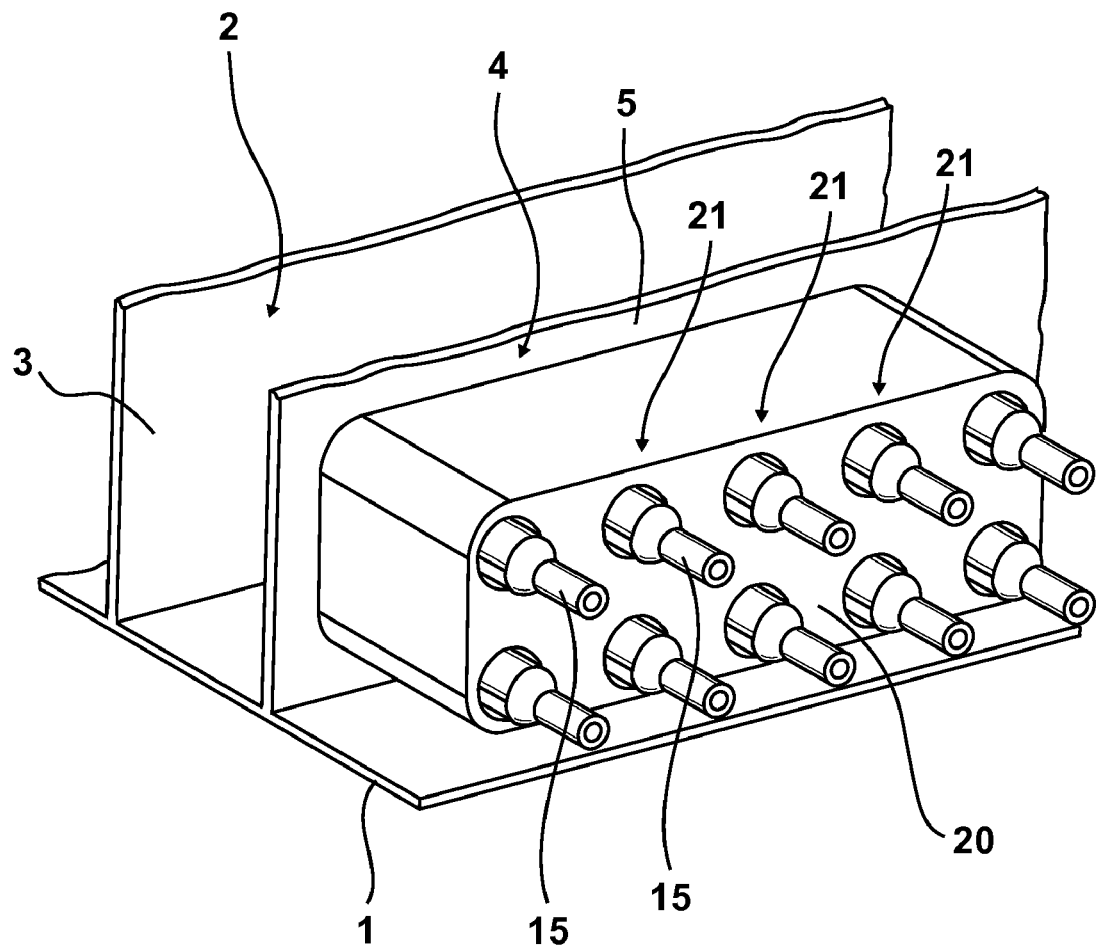
FIG. 2 shows an embodiment as shown in FIG. 1, the fuse housing being a constituent part of a housing block that is fastened to the wall between the one and the other chamber.
Figure 3:
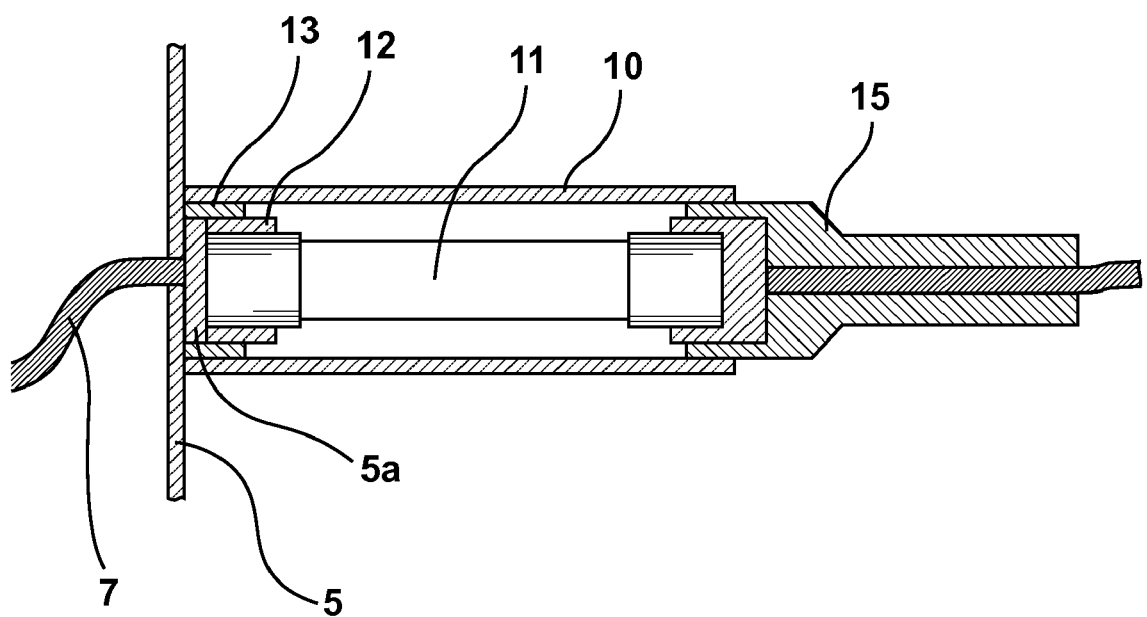
FIG. 3 shows how a plug connector is mounted to the wall in a sectional view.

The embodiment shown in FIG. 2 differs in that there is provided a housing block 20 that comprises a plurality of fuse housings 21 in the form of cylindrical openings that are configured to be similar in principle to the fuse housings illustrated in FIG. 3, except that now the fuse housings are formed by the housing block 20 itself. The advantage thereof is that the housing block can be mounted to the wall and sealed as a whole. Here also, a fuse receptacle is provided with respect to each fuse or correspondingly for each plug connector, said fuse receptacle serving for respectively accommodating the fuse 11, the openings 21 forming the fuse housings for receiving the plug connectors 15 being provided in the housing block 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A photovoltaic inverter with an inverter housing comprising:
    at least a first chamber and a second chamber separated by a wall, the first chamber having a higher Ingress Protection (IP) rating than the second chamber, the first chamber accommodating at least one electronic component part of the photovoltaic inverter,
    a surface of the wall facing the second chamber provides a plurality of fuse housings, each of the fuse housings accommodating a fuse and being coupled to a plug connector electrically connected to the fuse, the plug connectors providing electrical connections to the first chamber.

2. The photovoltaic inverter of claim 1, wherein each plug connector is configured to be pushed into the respective fuse housing.

3. The photovoltaic inverter of claim 1, wherein each fuse housing is accommodated by a fuse receptacle disposed in the wall, each fuse receptacle providing an electrical connection to the at lease one electronic component part.

4. The photovoltaic inverter of claim 3, wherein the at least one electronic component part is a circuit board.

5. The photovoltaic inverter of claim 3, wherein each fuse receptacle includes a cylindrical appended portion configured to couple to the respective fuse housing.

6. The photovoltaic inverter of claim 1, wherein each fuse housing is integrally connected with the respective plug connector, each plug connector and fuse housing being removably fastened to at least one of the respective fuse receptacle and a respective appended portion on the wall.

7. The photovoltaic inverter of claim 6, wherein, each plug connector and fuse housing is screwed or clamped to at least one of the respective fuse receptacle and the respective appended portion.

8. The photovoltaic inverter as set forth in claim 1, wherein the plurality of fuse housings form a housing block, the housing block accommodating the plurality of plug connectors.

* * * * *